(12) United States Patent
Ichinohe et al.

(10) Patent No.: US 11,530,721 B2
(45) Date of Patent: Dec. 20, 2022

(54) SEALING DEVICE

(71) Applicant: SUBARU CORPORATION, Tokyo (JP)

(72) Inventors: Katsuyuki Ichinohe, Tokyo (JP); Kengo Ito, Tokyo (JP); Yasufumi Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/501,344

(22) Filed: Oct. 14, 2021

(65) Prior Publication Data

US 2022/0128094 A1 Apr. 28, 2022

(30) Foreign Application Priority Data

Oct. 23, 2020 (JP) .............................. JP2020-178338

(51) Int. Cl.
*F16C 33/78* (2006.01)
*F16J 15/3264* (2016.01)
*F16J 15/3244* (2016.01)
*F16C 33/80* (2006.01)

(52) U.S. Cl.
CPC ....... *F16C 33/7883* (2013.01); *F16J 15/3244* (2013.01); *F16J 15/3264* (2013.01); *F16C 33/7876* (2013.01); *F16C 33/805* (2013.01); *F16C 2326/02* (2013.01)

(58) Field of Classification Search
CPC .. F16C 33/7879; F16C 33/7883; F16C 33/80; F16C 33/805; F16J 15/3244; F16J 15/3264
See application file for complete search history.

(56) References Cited

U.S. PATENT DOCUMENTS

| | | | | |
|---|---|---|---|---|
| 6,629,816 B2 * | 10/2003 | Langston | ............... | F16J 15/164 |
| | | | | 415/230 |
| 7,055,827 B2 * | 6/2006 | Langston | ............. | F16J 15/4476 |
| | | | | 277/424 |
| 8,808,099 B2 * | 8/2014 | Finetti | ................. | B60B 27/0036 |
| | | | | 277/572 |

(Continued)

FOREIGN PATENT DOCUMENTS

JP 2015-86993 A 5/2015
WO WO-2012171719 A1 * 12/2012 ........... F04D 29/582

*Primary Examiner* — Nicholas L Foster
(74) *Attorney, Agent, or Firm* — Troutman Pepper Hamilton Sanders LLP (57) ABSTRACT

A sealing device includes a metal core configured to be attached to a stationary member of a bearing mechanism, an annular slinger configured to be attached to a rotary member of the bearing mechanism, a seal member attached to the metal core, and a discharge body. The discharge body includes a base having discharge holes, an attachment that is continuous with the base and attached to the slinger, and fins protruding from the base. The discharge body is configured to be rotated together with the slinger. A communication space surrounded by the slinger and the seal member is configured to communicate with an external space of the bearing mechanism via an opening. At least the fins of the discharge body are positioned in the communication space. When the rotary member rotates, an inflow flowed into the communication space is moved by the fins toward the external space.

12 Claims, 8 Drawing Sheets

(56) References Cited

U.S. PATENT DOCUMENTS

| | | | | |
|---|---|---|---|---|
| 10,018,272 B2 * | 7/2018 | Toth | ............... | F16J 15/3244 |
| 2003/0035718 A1 * | 2/2003 | Langston | ............ | F16J 15/4476 |
| | | | | 415/123 |
| 2003/0178783 A1 * | 9/2003 | Langston | ............ | F16J 15/4476 |
| | | | | 277/423 |
| 2011/0006485 A1 * | 1/2011 | Nakagawa | ........... | F16J 15/3264 |
| | | | | 277/549 |
| 2013/0087978 A1 * | 4/2013 | Nakagawa | ........... | F16J 15/3264 |
| | | | | 277/349 |
| 2013/0184086 A1 * | 7/2013 | Finetti | ................ | F16C 33/805 |
| | | | | 464/139 |
| 2014/0265152 A1 * | 9/2014 | Toth | ................ | F16J 15/324 |
| | | | | 277/549 |
| 2020/0386317 A1 * | 12/2020 | Arai | ................ | F16C 19/185 |
| 2021/0115973 A1 * | 4/2021 | Sakano | ............... | F16J 15/3264 |
| 2022/0213931 A1 * | 7/2022 | Seki | ................ | F16J 15/3232 |

* cited by examiner

SEALING DEVICE

CROSS-REFERENCE TO RELATED APPLICATION

The present application claims priority from Japanese Patent Application No. 2020-178338 filed on Oct. 23, 2020, the entire contents of which are hereby incorporated by reference.

BACKGROUND

The disclosure relates to a technical field about a sealing device to be used in a bearing mechanism of a vehicle.

In vehicles such as automobiles, bearing mechanisms are used to ensure stable rotation of rotational parts. For example, a hub bearing is disposed as a bearing mechanism in a support unit of a vehicle wheel.

The hub bearing includes an outer race and an inner race. The outer race is a stationary member configured to be fixed to a vehicle body. The inner race is a rotary member to which a vehicle wheel is to be attached. The inner race is supported by the outer race so as to be rotatable around an axis. In the hub bearing, rollers that are in contact with the outer race and the inner race are disposed between these races. The inner race can smoothly rotate relative to the outer race as the rollers are rolled.

However, with the hub bearing described above, for example, if an inflow such as mud or dust splashed by a vehicle wheel during driving enters the inside of the hub bearing from a gap between the outer race and the inner race and reaches the rollers, malfunctioning or a failure of the bearing mechanism may occur.

It may be possible to prevent entry of an inflow by sealing the gap between the outer race and the inner race by providing the outer race with a seal member that contacts the inner race. In this case, however, as the contact area between the seal member and the inner race increases, rotational resistance increases, and the performance of the bearing mechanism may decrease. Therefore, in general, the hub bearing includes, in the gap between the outer race and the inner race at an end of the hub bearing, a sealing device for preventing entry of an inflow in a state in which the contact area between the seal member and the rotary member is reduced.

Among sealing devices configured as described above, there is a known sealing device that prevents entry of an inflow into a space in a bearing mechanism further inside than the sealing device by holding back the inflow in a communication space in the sealing device and causes the inflow that has been held back to flow out to an external space of the bearing mechanism by using rotation of the inner race (see, for example, Japanese Unexamined Patent Application Publication No. 2015-86993).

SUMMARY

An aspect of the disclosure provides a sealing device to be used in a bearing mechanism. The sealing device includes a metal core, an annular slinger, a seal member, and a discharge body. The metal core is configured to be attached to a stationary member of the bearing mechanism. The annular slinger is configured to be attached to a rotary member of the bearing mechanism and to be rotated together with the rotary member. The seal member is attached to the metal core and includes a contact including a part that is in contact with the slinger. The discharge body includes an annular base that has discharge holes that are separated from each other in a circumferential direction, an attachment that is continuous with the base and attached to the slinger, and fins that protrude from the base and are positioned separated from each other in the circumferential direction. The discharge body is configured to be rotated together with the slinger. A space surrounded by the slinger and the seal member is a communication space that is configured to communicate with an external space of the bearing mechanism via an opening. At least the fins of the discharge body are positioned in the communication space. When the rotary member rotates, an inflow flowed into the communication space is moved by the fins toward the external space.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In a sealing device, if an inflow does not sufficiently flow out to an external space of a bearing mechanism and the inflow amount of an inflow that flows into a communication space exceeds the outflow amount, it may not be possible to hold back the inflow in the communication space and the inflow may enter a space in the bearing mechanism further inside than the sealing device.

It is desirable to ensure good operating conditions of a bearing mechanism by preventing entry of an inflow to a space in the bearing mechanism further inside than a sealing device.

Hereafter, a sealing device according to an embodiment of the disclosure will be described with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Structure of Bearing Mechanism

Figure 1:
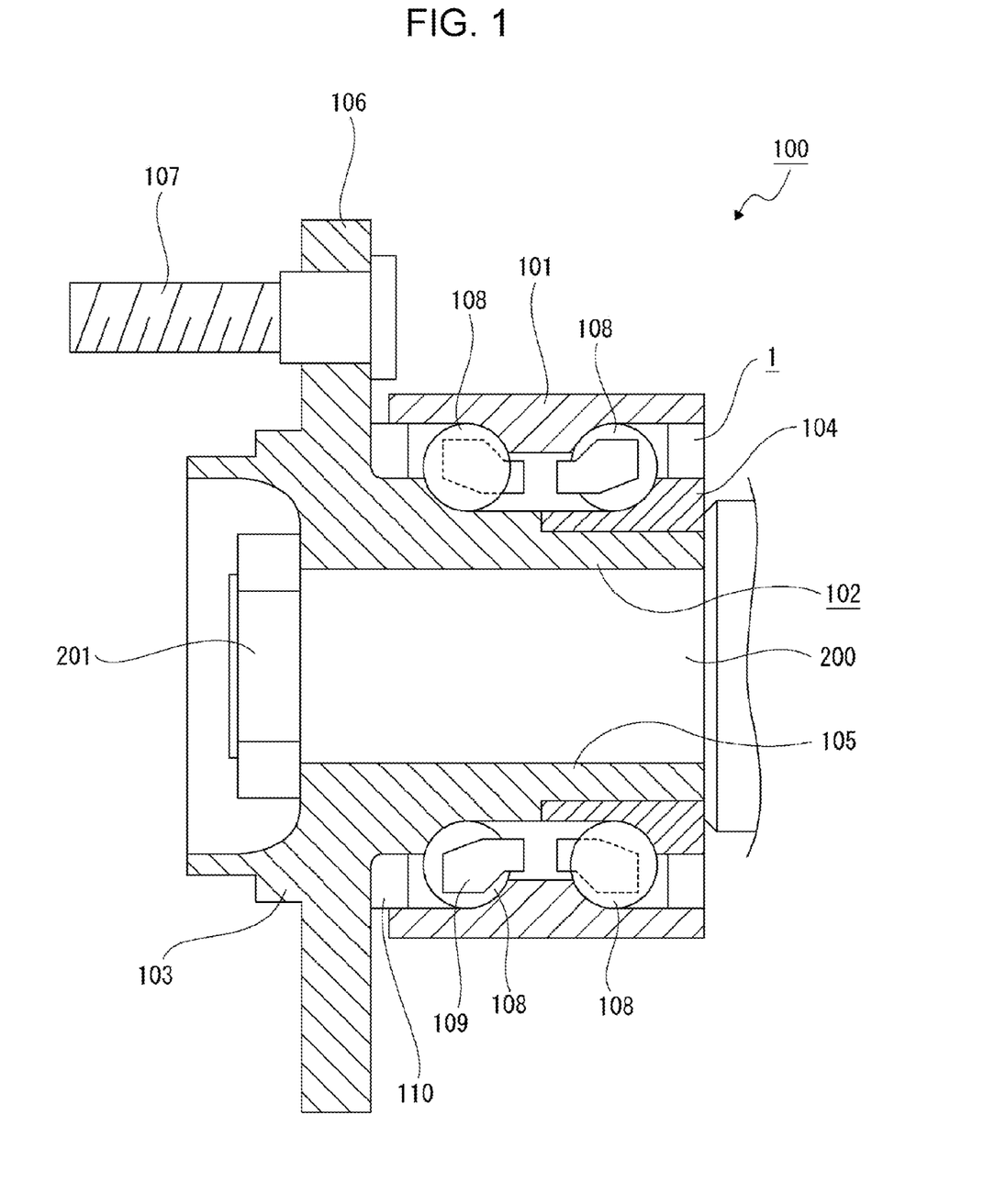
FIG. 1 is a schematic view of a bearing mechanism including a sealing device, illustrating a sealing device according to an embodiment of the disclosure, as with FIGS. 2 to 8.

First, the schematic structure of a bearing mechanism 100 including a sealing device will be described (see FIG. 1).

The bearing mechanism 100 includes an outer race 101 that is fixed to a vehicle body and an inner race 102 that is rotatable relative to the outer race 101.

The outer race 101 has a cylindrical shape and is a stationary member that is fixed to a support unit (not illustrated) of a vehicle.

The inner race 102 is composed of a hub 103 and a coupling ring 104, each of which has an annular shape. The inner race 102 is a rotary member that is rotated in accordance with the rotation of a drive shaft 200 that is coupled to a differential mechanism (not illustrated), a propeller shaft (not illustrated), or the like. The hub 103 includes a body 105 having a cylindrical shape and a hub flange 106 that protrudes outward from the body 105. The inner race 102 is held by the drive shaft 200 as a nut 201 is fastened to the drive shaft 200 inserted through the body 105, and is rotated in accordance with the rotation of the drive shaft 200. Bolts 107 are inserted through the hub flange 106 in a state in which the bolts 107 are separated from each other in the circumferential direction. A vehicle wheel (not illustrated) is attached to the inner race 102 by using the bolts 107. The coupling ring 104 is coupled to an end of the body 105 on the vehicle body side.

Between the outer race 101 and the inner race 102, rollers 108 are disposed separated from each other in the circumferential direction in a state in which the rollers 108 are held by a cage 109. In the bearing mechanism 100, the inner race 102 is smoothly rotated relative to the outer race 101 as the rollers 108 are rolled when the inner race 102 rotates.

A sealing device 1 is disposed between the outer race 101 and the coupling ring 104 at an end of the bearing mechanism 100 on the vehicle body side. A sealing member 110 having, for example, a labyrinthine structure is attached to an end of the outer race 101 on the vehicle wheel side. The sealing member 110 seals the gap between the outer race 101 and the inner race 102.

Structure of Sealing Device

Next, the structure of the sealing device 1 will be described (see FIGS. 2 to 4).

Figure 2:
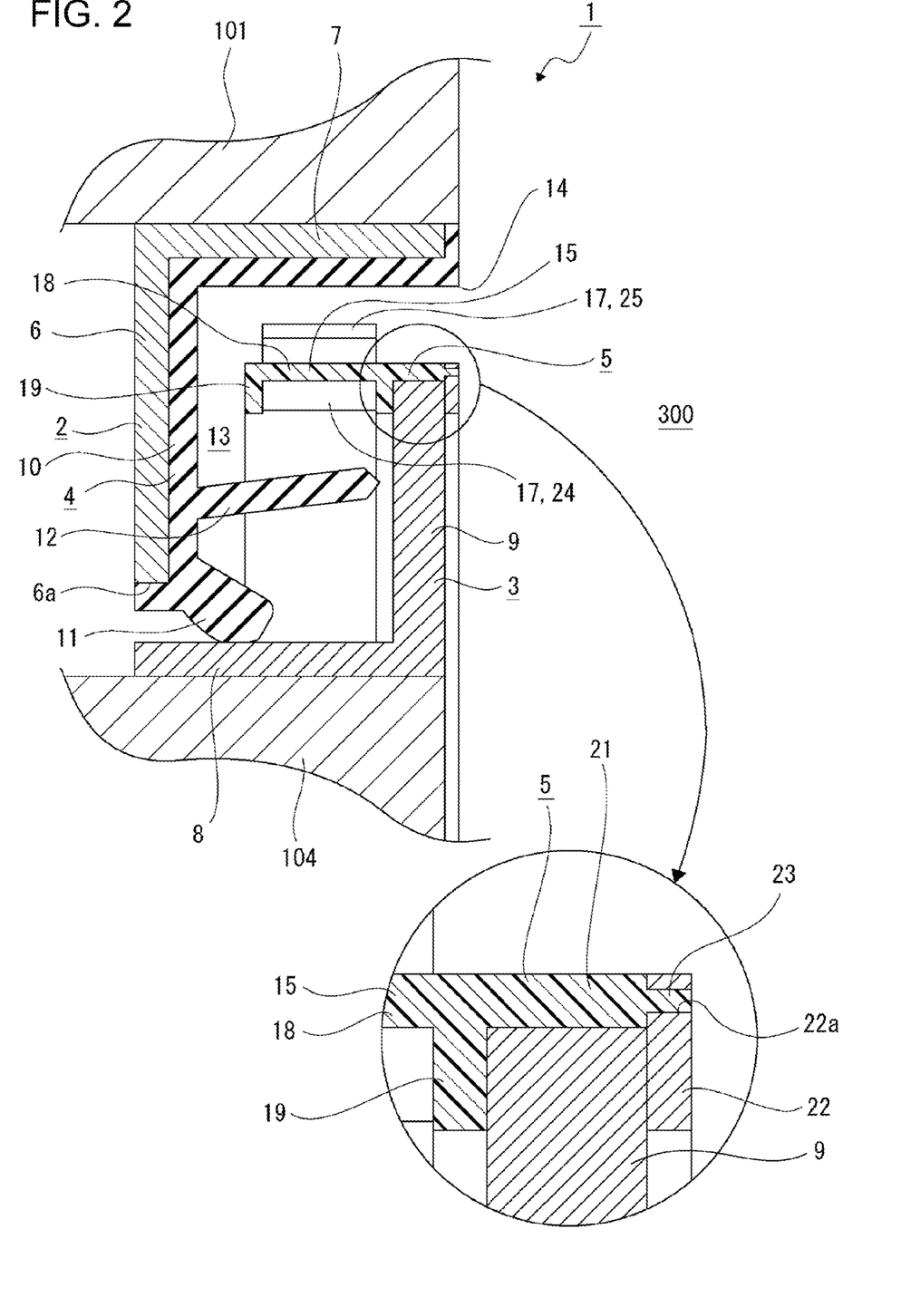
FIG. 2 is a sectional view of the sealing device.

The sealing device 1 has a substantially annular shape as a whole and includes a metal core 2 attached to the outer race 101, a slinger 3 attached to the coupling ring 104, a seal member 4 attached to the metal core 2, and a discharge body 5 attached to the slinger 3 (see FIG. 2).

The metal core 2 includes an annular portion 6 that faces in the axial direction of the drive shaft 200 and a first tubular portion 7 that protrudes from an outer peripheral edge of the annular portion 6 toward the vehicle body side. A space inside of the annular portion 6 is an insertion hole 6a that extends through the annular portion 6 in the axial direction. An outer peripheral surface of the first tubular portion 7 of the metal core 2 is fixed to the outer race 101.

The slinger 3 includes a second tubular portion 8 whose central axis coincides with the rotation axis of the drive shaft 200 and a flange 9 that protrudes outward from an end of the second tubular portion 8 on the vehicle body side. An inner peripheral surface of the second tubular portion 8 is fixed to the coupling ring 104. Accordingly, the slinger 3 rotates together with the inner race 102 in accordance with rotation of the drive shaft 200.

The slinger 3 is disposed on the inner peripheral side of the first tubular portion 7 in a state in which an end of the second tubular portion 8 is inserted through the insertion hole 6a of the annular portion 6. The flange 9 of the slinger 3 is positioned separated from the annular portion 6 in the axial direction.

The seal member 4 is made of an elastic material and includes a seal base 10 that is attached along the inside of the metal core 2 and a contact 11 and a lip 12 each of which extends from the seal base 10. The contact 11 protrudes from an inner peripheral edge of the seal base 10 toward the second tubular portion 8 side, and a distal end of the contact 11 is pressed against the outer peripheral surface of the second tubular portion 8 by an elastic force. The lip 12 is positioned further toward the outer peripheral side than the contact 11 in the radial direction, and protrudes toward the flange 9. A distal end of the lip 12 is positioned separated from the flange 9.

A space surrounded by the slinger 3 and the seal member 4 is a communication space 13. The communication space 13 communicates with an external space 300 of the bearing mechanism 100 via an opening 14 formed in the outside of an outer peripheral edge of the flange 9.

Figure 3:
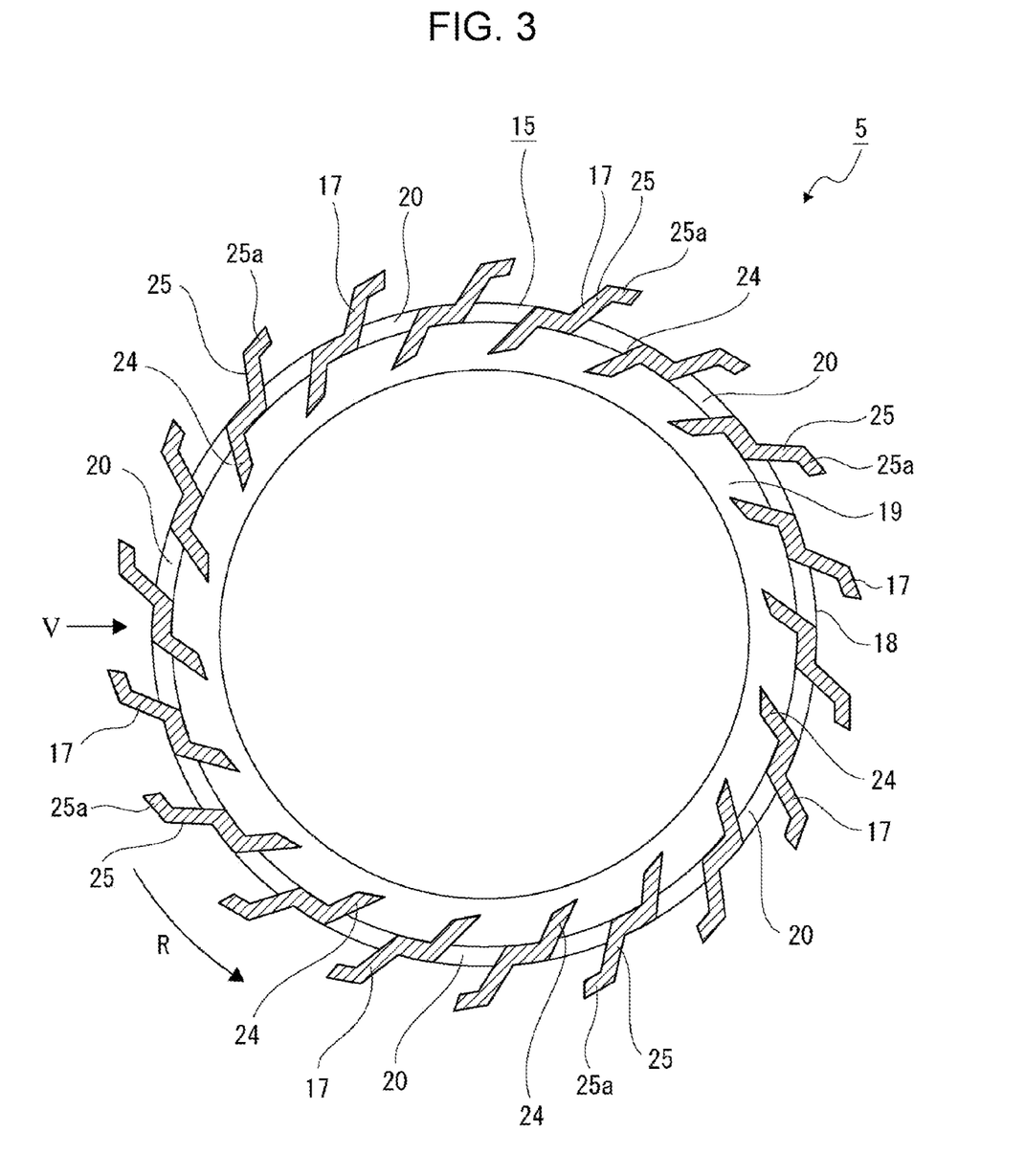
FIG. 3 is a sectional view of a discharge body.
Figure 4:
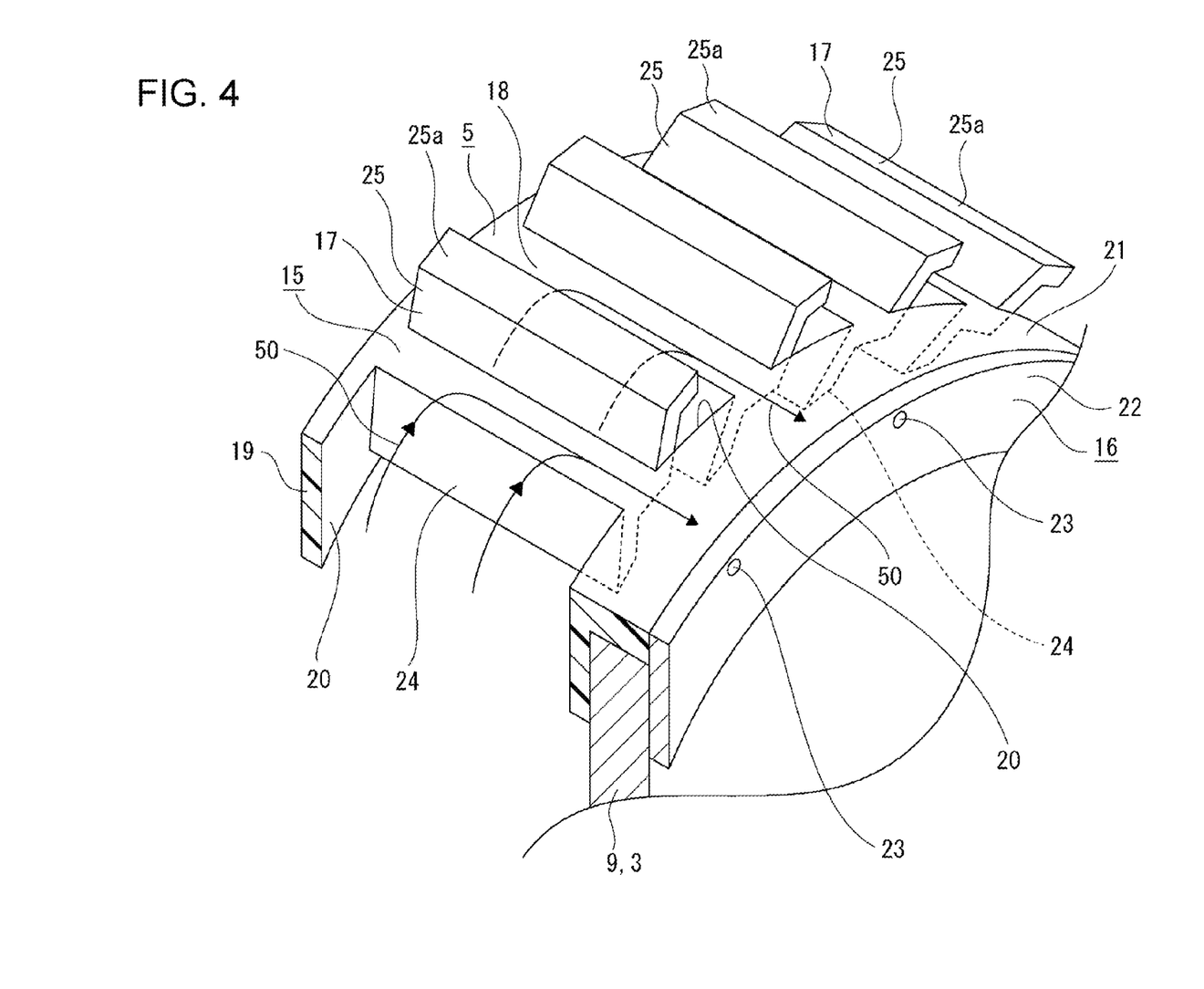
FIG. 4 is a partially-sectional perspective view of the discharge body.

The discharge body 5 includes a base 15, an attachment 16, and a plurality of fins 17 (see FIGS. 2 to 4). The attachment 16 of the discharge body 5 is attached to the slinger 3, and the discharge body 5 is rotated together with the slinger 3 in accordance with rotation of the inner race 102. For example, when the vehicle moves forward, the discharge body 5 is rotated in a rotation direction R illustrated in FIG. 3. The discharge body 5 is made of, for example, a resin material.

The base 15 includes a peripheral portion 18 whose central axis coincides with the rotation axis of the drive shaft 200 and a pair of side portions 19 that respectively extend inward from both ends in the axial direction of the peripheral portion 18. The peripheral portion 18 has discharge holes 20 that extend through the peripheral portion 18 in the radial direction and that are separated from each other in the circumferential direction of the discharge body 5. The discharge holes 20 each have a rectangular shape whose longitudinal direction is the width direction of the peripheral portion 18.

The attachment 16 includes a mating-face portion 21 that protrudes in the vehicle-body direction from an end of the peripheral portion 18 of the base 15 on the vehicle body side and a pressing ring 22 that is attached to the mating-face portion 21. The mating-face portion 21 has an inside diameter substantially the same as the outside diameter of the flange 9 and is fitted onto the flange 9. The mating-face portion 21 has attachment pins 23 that protrude toward the vehicle body side and are separated from each other in the circumferential direction. The pressing ring 22 has an outside diameter substantially the same as the outside diameter of the mating-face portion 21. Attachment holes 22a are formed in an outer peripheral part of the pressing ring 22 at positions corresponding to the attachment pins 23.

As the attachment pins 23 of the discharge body 5 are press-fitted into the attachment holes 22a in a state in which the mating-face portion 21 is fitted onto the flange 9, the discharge body 5 is attached to the slinger 3 in a state in which the flange 9 is held between one of the side portions 19 of the base 15 and the pressing ring 22. Accordingly, the base 15 is disposed near the opening 14 in the communication space 13 and is positioned further toward the outer peripheral side than the lip 12 of the seal member 4.

The pressing ring 22 may be attached to the mating-face portion 21 by forming distal ends of the attachment pins 23 as engagement hooks to be engaged with the pressing ring 22 and by engaging the attachment pins 23 with the pressing ring 22 in a state in which the attachment pins 23 are inserted through the attachment holes 22a. Thus, accidental removal of the pressing ring 22 from the mating-face portion 21 is prevented, and the discharge body 5 can be reliably attached to the slinger 3.

The fins 17 are disposed in a state in which the fins 17 protrude from opening edges of the discharge holes 20 in the peripheral portion 18 of the base 15 (see FIGS. 3 and 4). Accordingly, the fins 17 are disposed on the base 15 in a state in which the fins 17 are separated from each other in the circumferential direction of the discharge body 5.

The fins 17 each include an inner fin 24 that protrudes to the inside of the peripheral portion 18 and an outer fin 25 that protrudes to the outside of the peripheral portion 18 (see FIG. 3). The inner fins 24 and the outer fins 25 of the fins 17 are alternately positioned in the circumferential direction of the peripheral portion 18.

The inner fin 24 is inclined so as to be displaced forward in the rotation direction R with decreasing distance from the distal end thereof. The outer fin 25 is inclined so as to be displaced in the direction opposite to the rotation direction R with decreasing distance from the distal end thereof. Accordingly, the inner fin 24 and the outer fin 25 protrude in directions opposite to each other with the peripheral portion 18 interposed therebetween. A distal end 25a of the outer fin 25 is bent with respect to the other portions in a direction toward the peripheral portion 18.

Both ends in the width direction of the inner fin 24 are coupled to the two side portions 19 of the base 15. Thus, parts of each of the fins 17 are respectively formed so as to be continuous from the side portions 19 of the base 15. Accordingly, high strength of the fins 17 can be ensured.

Figure 5:
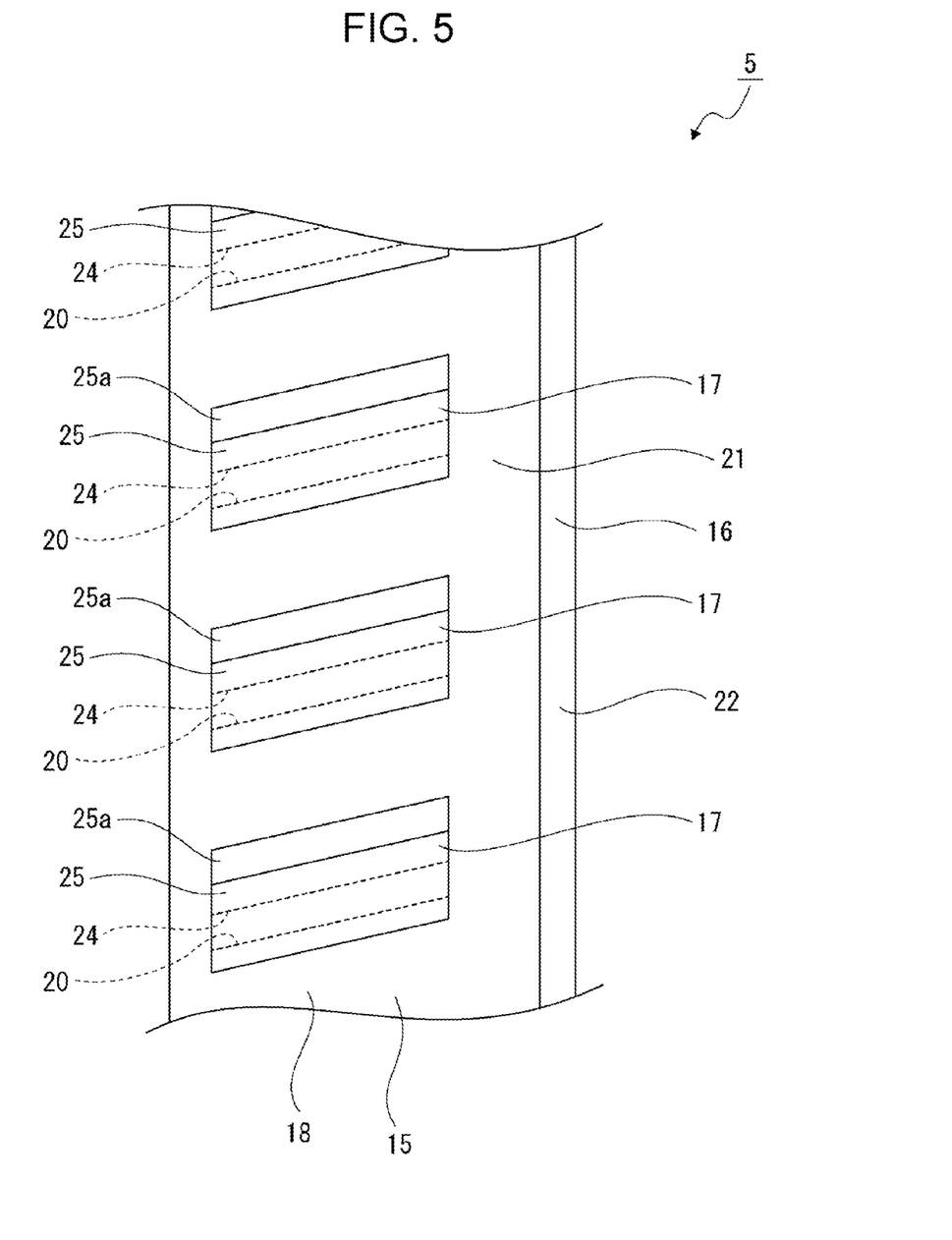
FIG. 5 is a schematic view as seen from a direction V of FIG. 3.

An end in the width direction of each of the fins 17 on the vehicle wheel side is positioned further forward in the rotation direction R than an end in the width direction of the fin 17 on the vehicle body side in the circumferential direction of the peripheral portion 18 (see FIG. 5). Accordingly, each of the fins 17 is inclined so as to be displaced forward in the rotation direction R with increasing distance from the attachment 16 in the width direction of the peripheral portion 18, and is displaced forward in the rotation direction R with increasing distance from the opening 14.

Hereafter, an operation of the sealing device 1 will be described (see FIG. 4).

When the vehicle moves, for example, forward, an inflow 50 such as mud or dust splashed by a vehicle wheel may flow into the communication space 13 from the opening 14.

The inflow 50 flowed into the communication space 13 flows to the inner peripheral side of the communication space 13. Because the contact 11, which is pressed against the second tubular portion 8, suppresses entry of the inflow 50 to a space in the bearing mechanism 100 further inside than the communication space 13, the inflow 50 is retained in the communication space 13 or flows out again through the opening 14 toward the external space 300 of the bearing mechanism 100.

At this time, if the inflow 50 does not flow out sufficiently and the inflow amount into the communication space 13 becomes greater than the outflow amount or if the inflow 50 flows into the communication space 13 with a high speed, the water pressure applied to the contact 11 may increase, the contact 11 may become displaced, and the inflow 50 may enter from a contact portion between the second tubular portion 8 and the contact 11 to the inside of a space in the bearing mechanism 100 further inside than the communication space 13. However, in the sealing device 1, the discharge body 5 prevents entry of the inflow 50 to the space further inside than the communication space 13.

In the sealing device 1, the inflow 50 flowed into the communication space 13 is moved by the slinger 3 that is rotated together with the inner race 102. Moreover, a centrifugal force acts on the inflow 50 that is being moved, and the inflow 50 is moved toward the outer peripheral side in the communication space 13.

A part of the inflow moved toward the outer peripheral side flows out to the external space 300 from the opening 14. Another part of the inflow 50 moved toward the outer peripheral side is moved toward the discharge body 5 that is rotated together with the inner race 102. The inflow 50 moved to the discharge body 5 is moved along the fins 17.

The inflow 50 moved to the discharge body 5 is first moved along the inner fins 24 and then is moved toward the outer peripheral side of the base 15 through the discharge holes 20. The inflow moved to the outer peripheral side of the base 15 is moved toward the opening 14 along the outer fins 25, and flows out from the opening 14 toward the external space 300. Accordingly, the inflow 50 can be efficiently moved toward the external space 300 of the bearing mechanism 100.

In the sealing device 1 described above, an end in the width direction of each of the fins 17 on the vehicle wheel side is positioned further forward in a rotation direction of the inner race 102 than an end in the width direction of the fin 17 on the vehicle body side in the circumferential direction of the peripheral portion 18. Thus, the inflow 50 can be easily moved by the fins 17 toward the opening 14 when the discharge body 5 rotates, and therefore the inflow 50 can efficiently flow out to the external space 300 of the bearing mechanism 100.

As described above, in the sealing device 1, the inflow 50 flowed into the communication space 13 is moved by the fins 17 of the discharge body 5 that is rotated in accordance with the inner race 102, and is moved via the discharge holes 20 toward the external space 300 of the bearing mechanism 100. Therefore, entry of the inflow 50 into a space in the bearing mechanism 100 further inside than the communication space 13 is prevented, and good operating conditions of the bearing mechanism 100 can be ensured.

Moreover, in the sealing device 1, the discharge body 5 is rotated in accordance with the rotation of the inner race 102. Therefore, a dedicated driving source for rotating the discharge body 5 is not necessary, and the discharge body 5 can be reliably rotated with a simple structure when the vehicle wheel rotates (when the vehicle moves).

Furthermore, in the sealing device 1, the base 15 of the discharge body 5 is positioned in the communication space 13, and the lip 12 of the seal member 4 is positioned between the contact 11 and the base 15 in the communication space 13. Thus, the base 15 and the lip 12 form a labyrinthine structure in the communication space 13, and therefore the flow speed of the inflow 50 flowing into the communication space 13 toward the contact 11 side can be reduced, and the flow amount of the inflow toward the contact 11 side can be reduced.

In the example of the sealing device 1 structured as described above, the fins 17 each include the inner fin 24 and the outer fin 25. However, the fins 17 may each include only the inner fin 24 (see FIG. 6).

Figure 6:
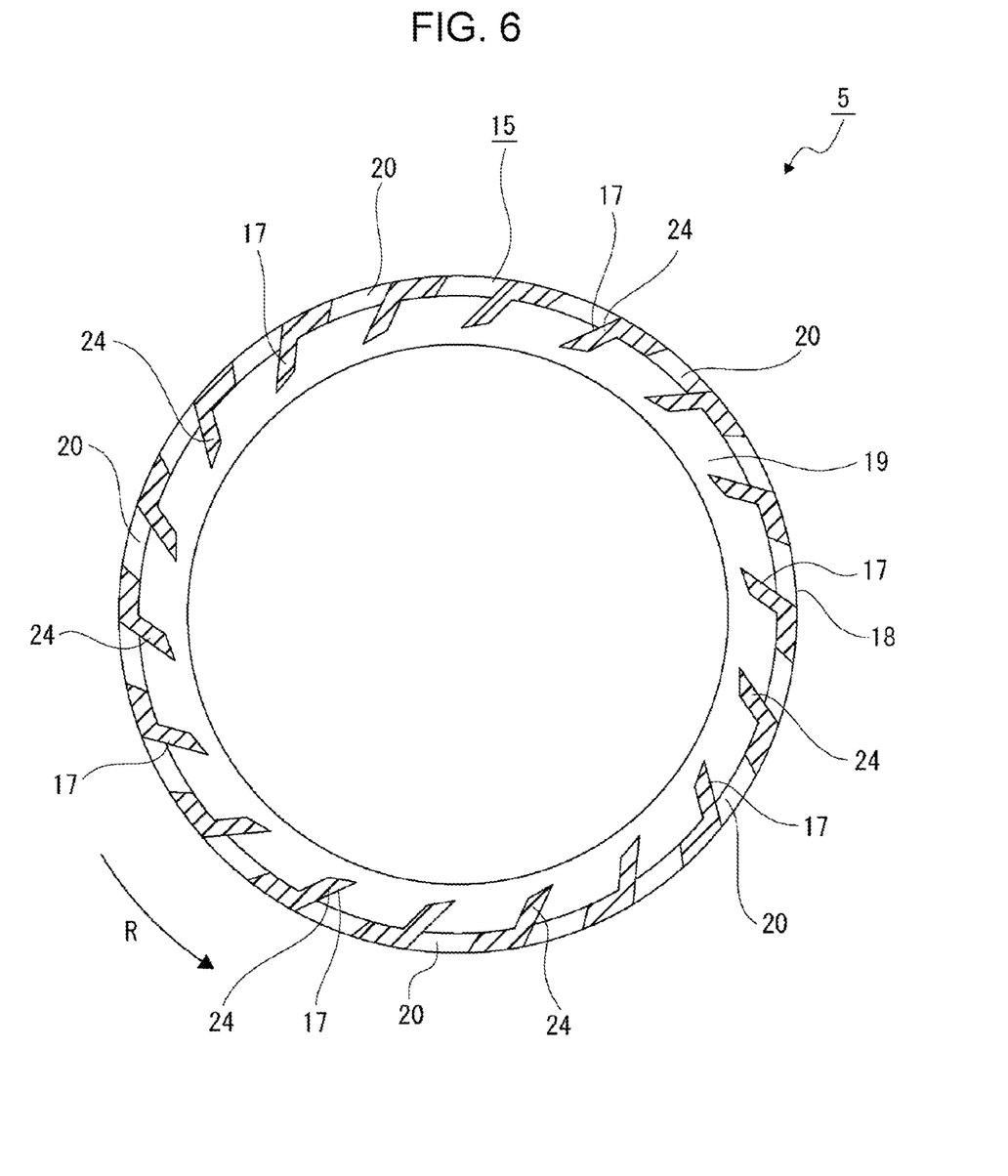
FIG. 6 is a sectional view illustrating an example in which fins each include only an inner fin.

With the structure in which the fins 17 each include only the inner fin 24, nothing protrudes from the peripheral portion 18 in the radial direction. Therefore, high strength of the discharge body 5 can be ensured, the fins 17 are not likely to interfere with a surrounding member when the discharge body 5 is assembled in the bearing mechanism 100, and the workability of assembly operation can be improved.

Figure 7:
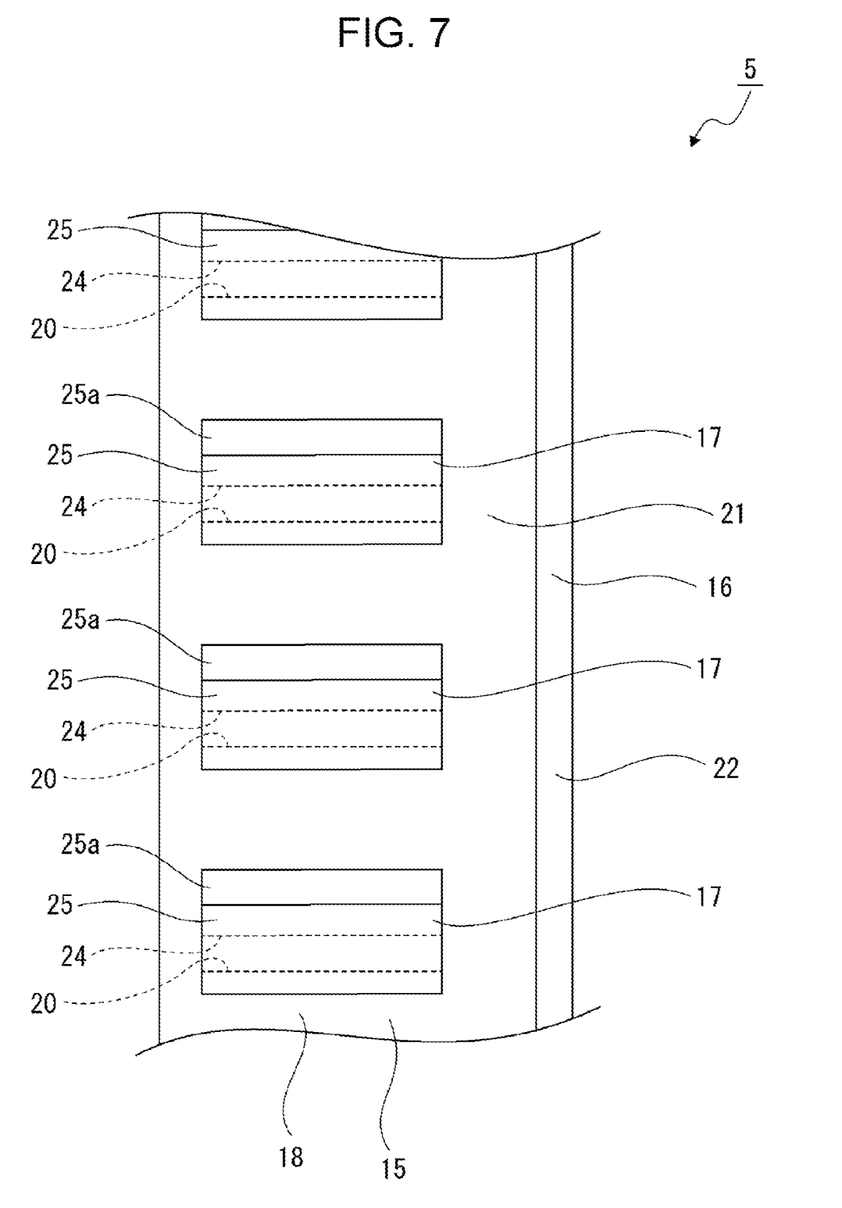
FIG. 7 illustrates an example in which fins are parallel to the axial direction of a base.

In the example described above, an end in the width direction of each of the fins 17 on the vehicle wheel side is positioned further forward in the rotation direction R of the inner race 102 than an end in the width direction of the fin 17 on the vehicle body side in the circumferential direction of the peripheral portion 18. However, the fins 17 may be disposed in the width direction parallel to the axial direction the base 15 (see FIG. 7).

Furthermore, in the example of the sealing device 1 described above, the attachment 16 includes the mating-face portion 21 and the pressing ring 22, the attachment pins 23 are disposed in the mating-face portion 21, and the pressing ring 22 has the attachment holes 22a. However, the attachment pins 23 may protrude from, instead of the mating-face portion 21, the side portion 19 of the base 15 on the flange 9 side, and the flange 9 may have attachment holes 9a (see FIG. 8).

Figure 8:
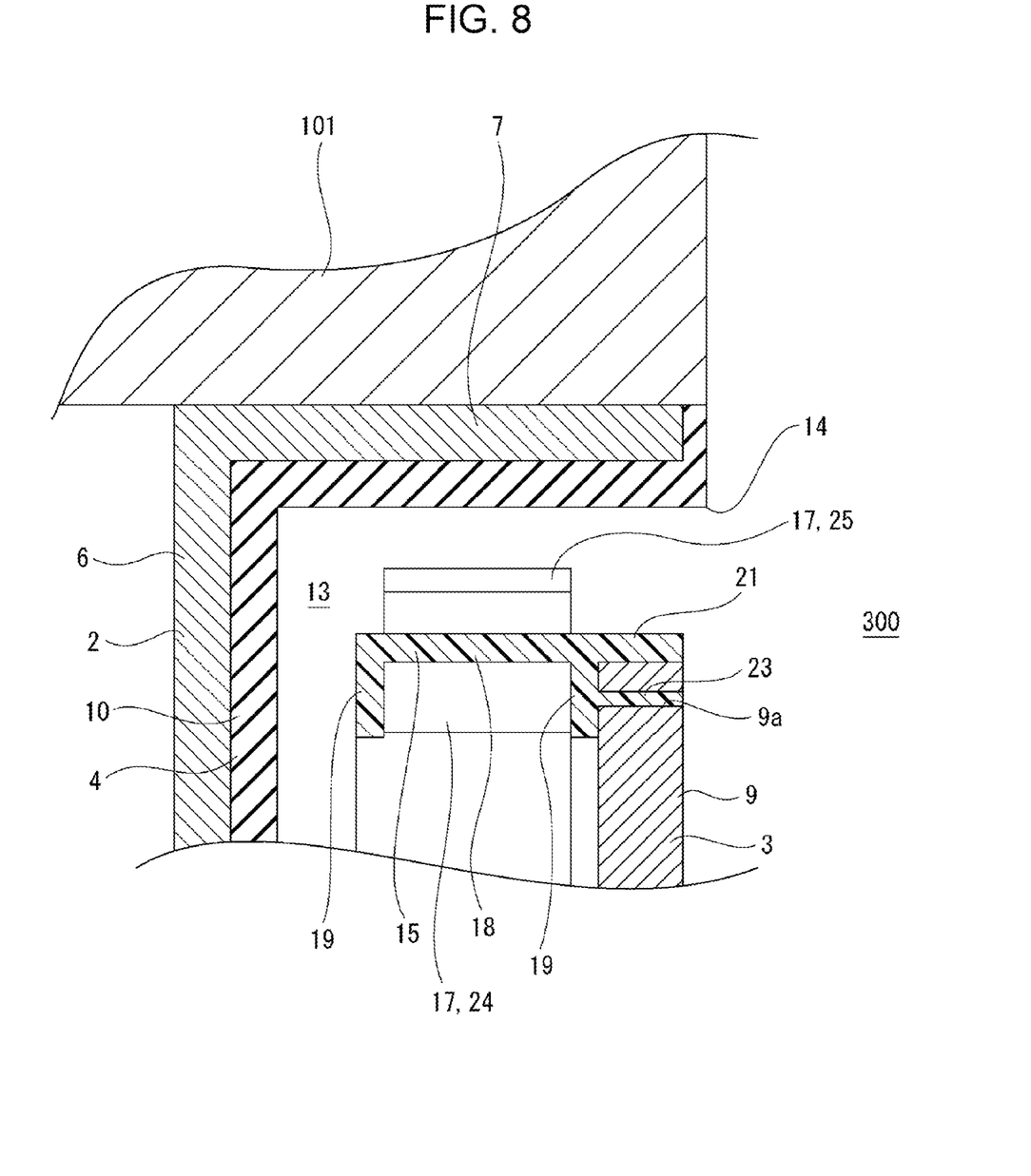
FIG. 8 is a sectional view illustrating an example in which an attachment pin protrudes from the base.

Thus, the discharge body 5 is attached to the slinger 3 by press-fitting the attachment pins 23 into the attachment holes 9a in a state in which the mating-face portion 21 is fitted onto the flange 9. Accordingly, the pressing ring 22 is not necessary, and therefore the number of components can be reduced and the operation of attaching the discharge body 5 to the slinger 3 can be simplified.

The invention claimed is:

1. A sealing device to be used in a bearing mechanism, the sealing device comprising:
   a metal core that is configured to be attached to a stationary member of the bearing mechanism;
   an annular slinger that is configured to be attached to a rotary member of the bearing mechanism and to be rotated together with the rotary member;
   a seal member that is attached to the metal core and comprises a contact including a part that is in contact with the slinger; and
   a discharge body that comprises
      an annular base that has discharge holes that are separated from each other in a circumferential direction,
      an attachment that is continuous with the base and attached to the slinger, and
      fins that protrude from the base and are positioned separated from each other in the circumferential direction,
      the discharge body being configured to be rotated together with the slinger,
   wherein a space surrounded by the slinger and the seal member is a communication space that is configured to communicate with an external space of the bearing mechanism via an opening,
   wherein at least the fins of the discharge body are positioned in the communication space, and
   wherein, when the rotary member rotates, an inflow flowed into the communication space is moved by the fins toward the external space.

2. The sealing device according to claim 1, wherein each of the fins comprises
   an inner fin protruding to an inside of the base and
   an outer fin protruding to an outside of the base.

3. The sealing device according to claim 2, wherein the base comprises
   a peripheral portion that is continuous with the fins and two side portions that protrude inward from both ends in an axial direction of the peripheral portion, and
   wherein both ends in a width direction of the inner fin are respectively continuous with the two side portions.

4. The sealing device according to claim 1, wherein an end in a width direction of each of the fins on a side far from the opening is positioned further forward in a rotation direction of the rotary member than an end in the width direction of the fin on a side close to the opening in the circumferential direction of the base.

5. The sealing device according to claim 2, wherein an end in a width direction of each of the fins on a side far from the opening is positioned further forward in a rotation direction of the rotary member than an end in the width direction of the fin on a side close to the opening in the circumferential direction of the base.

6. The sealing device according to claim 3, wherein an end in a width direction of each of the fins on a side far from the opening is positioned further forward in a rotation direction of the rotary member than an end in the width direction of the fin on a side close to the opening in the circumferential direction of the base.

7. The sealing device according to claim 1, wherein the base is positioned in the communication space,
   wherein the seal member comprises a lip that protrudes toward the slinger, and
   wherein the lip is positioned between the contact and the base in the communication space.

8. The sealing device according to claim 2, wherein the base is positioned in the communication space,
   wherein the seal member comprises a lip that protrudes toward the slinger, and
   wherein the lip is positioned between the contact and the base in the communication space.

9. The sealing device according to claim 3, wherein the base is positioned in the communication space,
   wherein the seal member comprises a lip that protrudes toward the slinger, and
   wherein the lip is positioned between the contact and the base in the communication space.

10. The sealing device according to claim 4, wherein the base is positioned in the communication space,
    wherein the seal member comprises a lip that protrudes toward the slinger, and
    wherein the lip is positioned between the contact and the base in the communication space.

11. The sealing device according to claim 5, wherein the base is positioned in the communication space,
    wherein the seal member comprises a lip that protrudes toward the slinger, and
    wherein the lip is positioned between the contact and the base in the communication space.

12. The sealing device according to claim 6, wherein the base is positioned in the communication space,
    wherein the seal member comprises a lip that protrudes toward the slinger, and wherein the lip is positioned between the contact and the base in the communication space.

* * * * *